(12) United States Patent
Young et al.

(10) Patent No.: US 8,098,154 B2
(45) Date of Patent: Jan. 17, 2012

(54) SYSTEM AND METHOD OF SIMULATION

(75) Inventors: C. Gil Young, Winter Park, FL (US); John M. Hogan, Winter Springs, FL (US)

(73) Assignee: Lockheed Martin Corporation, Orlando, FL (US)

( * ) Notice: Subject to any disclaimer, the term of this patent is extended or adjusted under 35 U.S.C. 154(b) by 131 days.

(21) Appl. No.: 12/191,415

(22) Filed: Aug. 14, 2008

(65) Prior Publication Data

US 2009/0121862 A1 May 14, 2009

Related U.S. Application Data

(62) Division of application No. 11/460,301, filed on Jul. 27, 2006, now Pat. No. 7,501,945.

(51) Int. Cl.
*G08B 1/08* (2006.01)

(52) U.S. Cl. ............ 340/539.2; 340/539.1; 340/539.13; 340/539.23; 340/568.2; 340/691.2; 340/825.49; 340/825.69

(58) Field of Classification Search .......... 340/539.2, 340/539.1, 539.13, 531, 686.6, 573.1, 825.49, 340/825.69, 568.2, 691.2, 539.23, 515; 342/448, 342/464; 463/39, 40
See application file for complete search history.

(56) References Cited

U.S. PATENT DOCUMENTS

| | | | |
|---|---|---|---|
| 3,553,675 A | 1/1971 | Shaver et al. | |
| 3,809,966 A | 5/1974 | Tirrell et al. | |
| 4,454,414 A | 6/1984 | Benton | |
| 4,523,297 A | 6/1985 | Ugon et al. | |
| 4,529,870 A | 7/1985 | Chaum | |
| 4,538,056 A | 8/1985 | Young et al. | |
| 4,695,058 A | 9/1987 | Carter, III et al. | |
| 5,119,104 A | 6/1992 | Heller | |
| 5,320,358 A | 6/1994 | Jones | |
| 5,320,362 A | 6/1994 | Bear et al. | |
| 5,354,057 A | 10/1994 | Pruitt | |
| 5,374,456 A | 12/1994 | Matossian et al. | |
| 5,419,565 A | 5/1995 | Gordon et al. | |
| 5,672,128 A | 9/1997 | Conn | |
| 5,913,727 A | 6/1999 | Ahdoot | |
| 6,204,813 B1 | 3/2001 | Wadell et al. | |
| 6,347,813 B1 | 2/2002 | Star et al. | |
| 6,569,011 B1 | 5/2003 | Lynch et al. | |
| 6,579,097 B1 | 6/2003 | Sampson et al. | |
| 6,720,921 B2 | 4/2004 | Ripingill, Jr. et al. | |
| 6,831,603 B2 * | 12/2004 | Menache ................ 342/463 |

(Continued)

FOREIGN PATENT DOCUMENTS

EP 0082690 6/1983

(Continued)

OTHER PUBLICATIONS

Requirement for Election/Restriction mailed May 28, 2008, for U.S. Appl. No. 11/460,301.

(Continued)

*Primary Examiner* — Hung T. Nguyen
(74) *Attorney, Agent, or Firm* — Withrow & Terranova, PLLC

(57) ABSTRACT

A simulation system includes a two-dimensional electrical grid installed in a floor or floor mat. Signals from boot mounted transmitters can be sensed via the grid to track boot locations in real-time during training exercises.

14 Claims, 2 Drawing Sheets

U.S. PATENT DOCUMENTS

| | | | |
|---|---|---|---|
| 6,917,288 B2 | 7/2005 | Kimmel et al. | |
| 7,400,244 B2 * | 7/2008 | Lindero | 340/539.13 |
| 2001/0011954 A1 | 8/2001 | Shelton et al. | |
| 2005/0202905 A1 | 9/2005 | Chesser | |

FOREIGN PATENT DOCUMENTS

| | | |
|---|---|---|
| EP | 0125143 | 11/1984 |
| EP | 0480413 | 4/1992 |
| FR | 2604808 | 10/1986 |
| JP | 2003346267 A | 5/2003 |
| WO | WO 88/04453 | 6/1988 |
| WO | WO 91/17515 | 11/1991 |
| WO | WO 96/15419 | 5/1996 |

OTHER PUBLICATIONS

Ex Parte Quayle Action mailed Jul. 18, 2008, for U.S. Appl. No. 11/460,301.

Notice of Allowance and Fees Due mailed Nov. 17, 2008, for U.S. Appl. No. 11/460,301.

Requirement for Election/Restriction mailed Dec. 24, 2009, for U.S. Appl. No. 12/194,932.

Non-Final Rejection mailed Apr. 30, 2010, for U.S. Appl. No. 12/194,932.

Final Rejection mailed Oct. 13, 2010, for U.S. Appl. No. 12/194,932.

* cited by examiner

SYSTEM AND METHOD OF SIMULATION

CROSS-REFERENCE TO RELATED APPLICATION

This application is a Divisional of and claims the benefit of the filing date of U.S. patent application Ser. No. 11/460,301 filed Jul. 27, 2006, U.S. Pat. No. 7,501,945, and entitled "System and Method of Simulation".

FIELD

The invention pertains to methods and systems for training individuals in responding to various types of high stress or emergency situations. More particularly, the invention pertains to combat simulators, fire fighting simulators, or policing simulators, all of which can unfold in an urban setting.

BACKGROUND

A need exists for simple systems for locating multiple participants in simulated urban combat. One technique for doing this is by using a floor that can read out the location of multiple participants' boots as they move around across the floor. None of the known systems are fully satisfactory for meeting the urban combat training requirements.

One known solution uses pressure sensors embedded in the floor to sense where the feet are positioned. This approach cannot distinguish between individual participants. Other solutions do not use an instrumented floor and depend on IR beams, magnetic transmitters and sensors, acoustics, and inertial sensors. They all have shortcomings because of cost, complexity, interference due to the all-metal enclosure where the training will take place, or other problems.

There is thus a continuing need for cost effective simple and reliable systems and methods for tracking individuals in a region who are participating in high stress or emergency situation simulations. Preferably information could be provided in real-time as to the location(s) of the respective individual(s). It would also be preferable if such systems could be implemented relatively inexpensively and readily installable in simulation locations.

DETAILED DESCRIPTION

Figure 1:
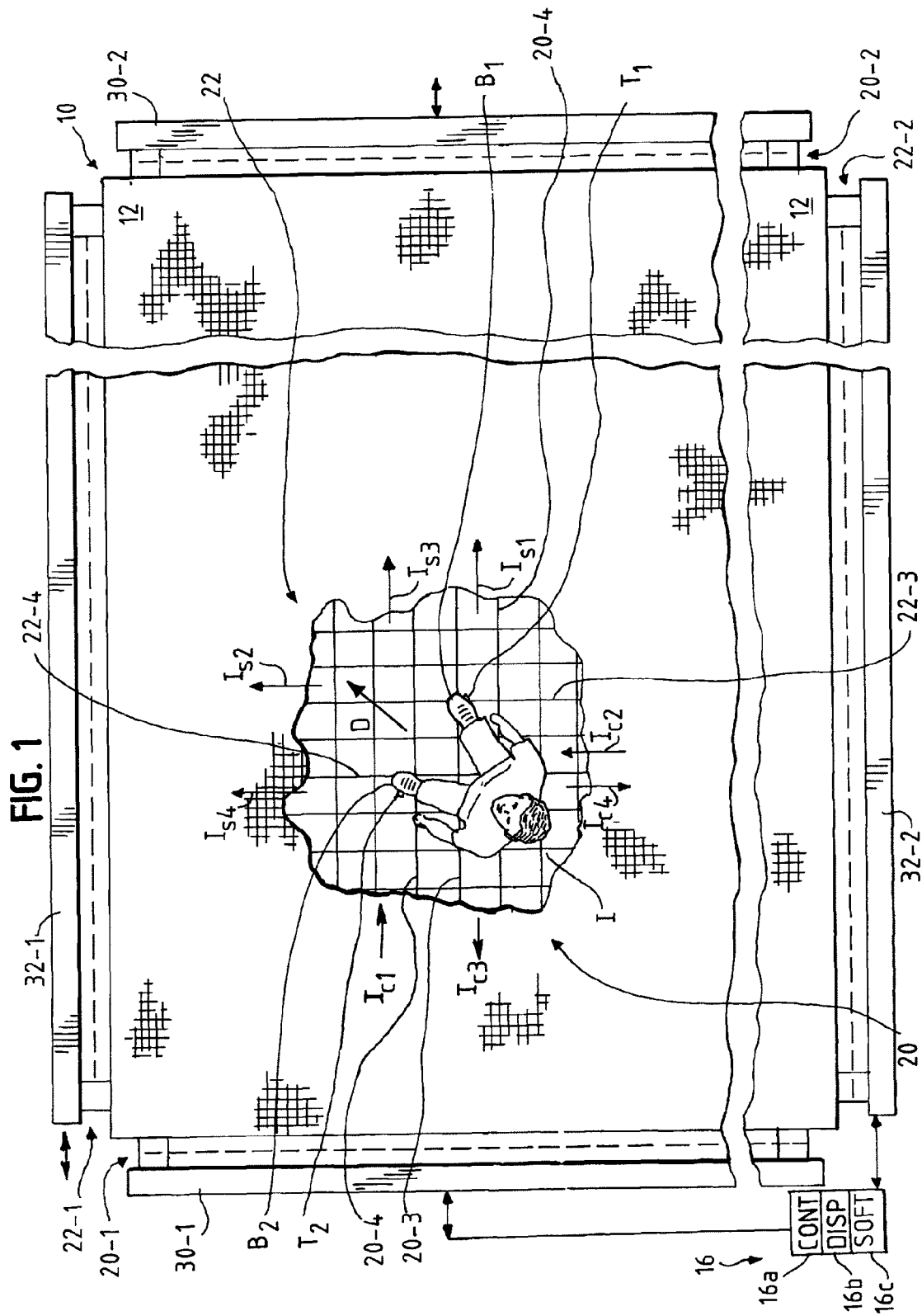
FIG. 1 is a top plan view of a training facility instrumented in accordance with the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one embodiment of the present invention, a floor is covered by a mat or carpet containing a rectangular grid of embedded wires, perhaps spaced about six inches apart. The participants carry pulsed or continuous-wave wireless transmitters affixed to their boots such that when a transmitter is close to one or more of the wires, currents are induced in the wires. By determining which wires are receiving the induced signals the location(s) of the transmitting boot(s) can be determined. Different participants have different-frequency transmitters so that each participant can be individually tracked.

The embedded wires can also carry an AC current so that the transmitters can be inductively powered from the grid thereby energizing the transmitters. As a result, the transmitters can be passive in that they do not require batteries. Transmitters emit RF, electromagnetic, waves.

At the edges of the embedded grid the wires can be coupled to processing circuitry and/or fed to a central location where signals are extracted and the power input for inductive powering of the transmitters is applied. The powering currents have a frequency separated from the signal frequencies so that the signal frequencies can be extracted with a minimum of interference from the powering currents. The powering currents flow in opposite directions in adjacent wires, thus creating an array of magnetic loops which have their axes oriented vertically.

A transmitter module in accordance with the invention incorporates a coil with a vertical axis for coupling to the powering currents in the floor grid. The power generated is stored in a capacitor which acts as a battery to store the energy for use by the transmitter. The transmitter has an oscillator connected to a trio of orthogonal transmitting antennas, or, coils for maximum coupling to the embedded wires independent of the orientation of the boot, for example, if the participant is prone. The module is attached to the side of the boot by releasable tapes or other inexpensive easy to use structures. Each participant's transmitter(s), possibly one on each foot, operates at a different frequency so that they, and each of their feet, can be uniquely identified.

Embodiments of the invention are simple, low cost, and unambiguously track each participant's boot location(s) in real-time. Such embodiments can be installed very quickly and require no lengthy calibration of the location-determining equipment, as some of the known systems do.

FIG. 1 is a top plan view of a simulation and training region R wherein a system 10 in accordance with the invention has been installed. The system 10 incorporates a planar, two-dimensional mat 12. The mat 12 can be woven or molded all without limitation. The type of material used in the mat 12 is not a limitation of the invention.

In accordance with the invention, mats such as the mat 12, discussed in more detail subsequently, would be positioned in the regions in which the training and/or simulation activities are to be conducted. For example, if the facility is a multi-floor building mats such as the mat 12 can be installed on each of the floors as well as on the stairs. The mats function to provide position specifying and participant specifying signals to an associated control/display system 16. The system 10 can incorporate one or more programmable processors, such as the processors 16a, one or more graphical display devices 16b and control software 16c which can be executed by the one or more processors 16a.

To provide the above-noted signals to the control 16, mat 12 preferably incorporates first and second pluralities 20, 22 of embedded wires which are insulated from one another. As illustrated in FIG. 1, the members of the plurality 20, 22 are oriented at right angles to one another forming an X,Y type grid. Preferably the members of each plurality will be positioned relatively close to each other, on the order of for example of 6 inches apart.

Ends such as ends 20-1, 20-2 and 22-1, 22-2 extend from the mat 12 and are interconnected and coupled to respective circuits 30-1, 30-2 and 32-1, 32-2. Circuitry 30-1, -2, 32-1, -2 can include multiplexer, de-multiplexer circuitry of types that would be known to those of skill in the art to enable the control system 16 to communicate with and receive communications from each of the members of the pluralities 20, 22 in the mat 12.

In accordance with the above, AC-type power signals of a predetermined frequency can be coupled to the members of the plurality 20, for example, members 20-3, 20-4. Preferably, these currents IC1 and IC3 will flow in opposite directions to one another, in adjacent wires, and as a result, create an array of magnetic loops which have their axes oriented vertically.

The electromagnetic fields established by the varying currents such as IC1, IC3 in the members of the plurality 20 as well as IC2 and IC4 in the members of the plurality 22 function as wireless sources of electrical energy which can be used to power transmitters such as T1, T2 which can be worn (for example on the boots B1, B2) of an individual I participating in the training or simulation in the region R. The transmitters T1, T2 inductively acquire electrical energy from the grid in the mat 12.

Each of the transmitter units T1, T2, emits identification signals at a substantially different frequency than the frequency of the energy supplying currents IC1, IC3, IC2 and IC4 as described above. Since each of the transmitters T1, T2 emits a different identifying wireless signal, which can be coupled to adjacent members of the plurality 20, 22 such as 20-3, 22-3 (adjacent to transmitter T1) and 20-4, 22-4 (adjacent to transmitter T2), location information, based on the intersection of 20-3 and 22-3, for boots B1, B2 is available in real-time.

Signals emitted by the transmitters T1, T2, inductively coupled to the members of the pluralities 20, 22 can be sensed at control system 16 via circuitry 30-1, -2, 32-1, -2. The location of the transmitters T1, T2 on the mat 12 can then be presented on the display 16b under the control of the software 16c. This provides a real-time display of the location of the boots B1, B2 of the individual I who is participating in the simulation.

As the individual I moves across the mat 12 in a direction D the presentation thereof on the display 16b also moves in real-time. The locations of multiple individuals in the region R can thus be displayed and tracked simultaneously.

Figure 2:
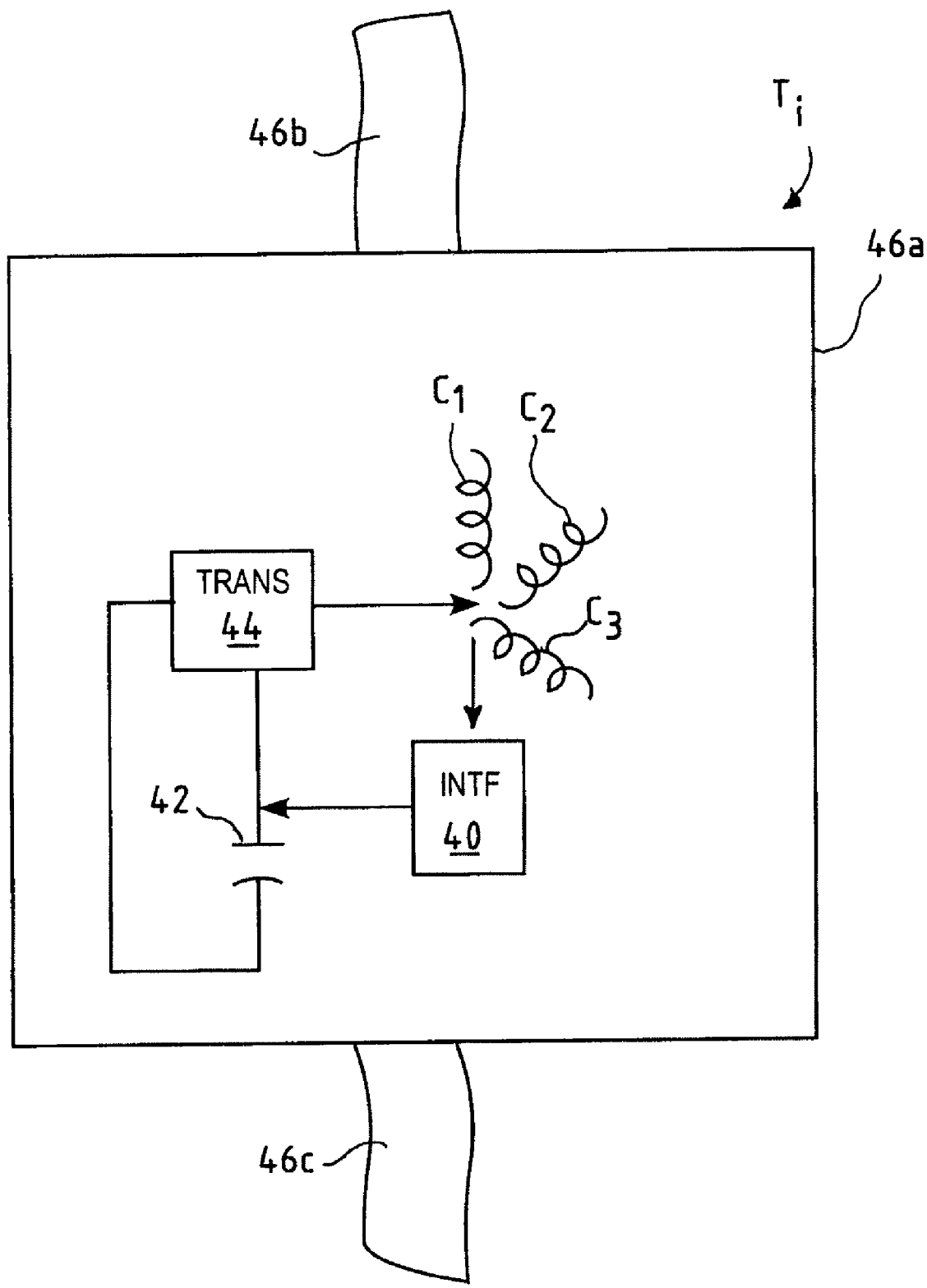
FIG. 2 is a block diagram of a boot mountable transmitting unit in accordance with the present invention.

FIG. 2 is a block diagram of a representative member of the plurality of transmitters Ti. The unit Ti incorporates receiver circuitry, for example, interface circuitry 40 which is in turn coupled to storage capacitor 42. The interface circuitry 40 is also coupled to a coil, such as coil C1, having a vertical axis when the transmitters, such as Ti, are coupled to the respective boots of the participant in the simulation. This coil, for example, coil C1 inductively receives electrical energy from the various AC-type currents in the members of the plurality 20, 22. The associated electrical energy is coupled via interface circuits 40 and stored on capacitor 42.

The transmitter unit Ti also incorporates a transmitter 44 of uniquely identifying RF signals which can be emitted wirelessly via a trio of orthogonal transmitting coils such as C1, C2, C3. It will also be understood that the coil C1 which couples energy to the interface circuitry 40 as well as emitting a position indicating a wireless signal could be implemented with two separate coils without departing from the spirit and scope of the invention.

Preferably the trio of orthogonal coils C1, 2 and 3 will be used to provide maximum coupling to the embedded wires, the members of the plurality 20, 22 independent of the orientation of the respective boot Bi. This provides continual coupling of position identifying signals irrespective of whether the individual I is standing, kneeling or lying on the mat 12.

Each of the transmitting units Ti incorporates a housing 46a and attachment straps of 46b, c to attach the unit Ti to the individual's respective boot.

Those of skill will understand that the transmitting units Ti can be implemented with a variety of different circuitry and antenna all without departing from the spirit and scope of the present invention. When both boots are identified the orientation of the individual I is also identified. If it is unnecessary to identify the location of both of the boots B1, B2 of the individual I during a given exercise, only a single transmitter unit Ti will be needed to supply the location of the respective participant. The participant identifying images presented on the display 16b can be in color and individual participants can be identified using color as well as alpha numeric indicators.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A simulation method processed by a processor, comprising:
    establishing a substantially planar conductive grid comprising a plurality of conductive elements, wherein the plurality of conductive elements comprises a first plurality of conductive elements that extend linearly, spaced apart from one another, across the conductive grid, generally in a first direction, and a second plurality of conductive elements that extend linearly, spaced apart from one another, across the conductive grid, generally in a second direction;
    coupling electrical energy to at least portions of the conductive grid and thereby providing wireless electrical energy in a vicinity of the conductive grid;
    receiving by the conductive grid a wireless location indicating indicium relative to the conductive grid from a transmitter unit in the vicinity of the conductive grid;
    determining a location on the conductive grid where the wireless location indicating indicium was received by the conductive grid; and
    displaying the location of the wireless location indicium relative to the conductive grid.

2. The simulation method as in claim 1 which includes establishing a multi-dimensional display location.

3. The simulation method as in claim 2 which includes presenting at the multi-dimensional display location a multi-dimensional image of the conductive grid.

4. The simulation method as in claim 3 wherein the transmitter unit is powered by the wireless electrical energy provided in the vicinity of the conductive grid. indicator of the location relative to the grid.

5. The simulation method as in claim 4 which includes displaying a plurality of indicators of different locations relative to the conductive grid.

6. The simulation method as in claim 3 which includes displaying an orientation specifying indicator of the multi-dimensional display location relative to the conductive grid.

7. The simulation method as in claim 2 which includes installing the conductive grid in at least one of a floor or mat.

8. The simulation method as in claim 1 which includes dynamically displaying in real time an indicator of a moving location relative to the conductive grid.

9. The simulation method as in claim 1 where coupling electrical energy includes coupling at least one of a varying electrical current, or a varying electrical voltage to the conductive grid.

10. The simulation method as in claim 9 where coupling electrical energy includes coupling an alternating current to the conductive grid.

11. The simulation method as in claim 10 where coupling electrical energy includes causing adjacent alternating currents to flow in different directions in the conductive grid.

12. The simulation method of claim 1, wherein receiving by the conductive grid the wireless location indicating indicium relative to the conductive grid from the transmitter unit in the vicinity of the conductive grid comprises:
   receiving, by at least two conductive elements of the plurality of conductive elements, the wireless location indicating indicium from the transmitter unit, the transmitter unit being powered by the wireless electrical energy.

13. The method of claim 1, wherein displaying the location of the wireless location indicating indicium relative to the conductive grid further comprises displaying a representation of a participant at the location relative to the conductive grid.

14. A method for tracking a participant in a simulation processed by a processor, comprising:
   providing a conductive grid comprising a plurality of conductive elements, wherein the plurality of conductive elements comprises a first plurality of conductive elements that extend linearly, spaced apart from one another, across the conductive grid, generally in a first direction, and a second plurality of conductive elements that extend linearly, spaced apart from one another, across the conductive grid, generally in a second direction;
   applying an alternating current to the conductive grid and thereby providing wireless electrical energy in a vicinity of the conductive grid;
   receiving, by at least two conductive elements of the plurality of conductive elements, a signal from a transmitter unit worn by the participant in the simulation, the transmitter unit being powered by the wireless electrical energy;
   based on the signal received by the at least two conductive elements, determining a position of the participant with respect to the conductive grid; and displaying a representation of the participant at the position with respect to the conductive grid on a display device.

* * * * *